United States Patent [19]

Chande

[11] Patent Number: 4,795,227
[45] Date of Patent: Jan. 3, 1989

[54] BEAM SPLITTING FIBER OPTIC COUPLER

[75] Inventor: Tushar S. Chande, Schenectady, N.Y.

[73] Assignee: General Electric Company, Schenectady, N.Y.

[21] Appl. No.: 101,902

[22] Filed: Sep. 28, 1987

[51] Int. Cl.$^4$ .................................................. G02B 6/32
[52] U.S. Cl. ................................... 350/96.18; 350/169
[58] Field of Search ...................... 350/169, 170, 96.15, 350/96.16, 96.18, 96.20

[56] References Cited

U.S. PATENT DOCUMENTS

| | | | |
|---|---|---|---|
| 4,329,017 | 5/1982 | Kapany et al. | 350/96.18 |
| 4,564,736 | 1/1986 | Jones et al. | 219/121 L |
| 4,676,586 | 6/1987 | Jones et al. | 350/96.20 |
| 4,681,396 | 7/1987 | Jones | 350/96.18 |
| 4,722,582 | 2/1988 | Modone et al. | 350/96.16 |

OTHER PUBLICATIONS

"Precision Machining Technology by YAG Laser Using a Fiber-Optic System" by Harada, Japan Electronic Engineering, Dec. 1986 pp. 57-61.

Primary Examiner—Léon Scott, Jr.
Attorney, Agent, or Firm—Paul R. Webb, II; James C. Davis, Jr.

[57] ABSTRACT

The invention is directed to lens apparatus for splitting a light beam into a plurality of beam portions which are focused. The invention finds utility in laser-materials processing systems in which the inventive lens apparatus is embodied in a fiber optic output coupler so that the fiber transmitted laser beam is split and focused at a plurality of predetermined process points on a workpiece.

21 Claims, 5 Drawing Sheets

BEAM SPLITTING FIBER OPTIC COUPLER

The present invention is related in general to apparatus for splitting a beam of light and, more specifically, apparatus for splitting a laser beam into a plurality of focused beams having a predetermined pattern.

BACKGROUND OF THE INVENTION

The use of lasers in manufacturing/materials processing (e.g. drilling, welding, etc.) historically required locating the laser close to the workpiece being subjected to processing. Various optical components, such as mirrors, beam splitters and lenses, were used to direct and focus the laser beam at each desired point on the workpiece where a processing operation was required. This implicitly required precise alignment of the optical components and workpiece to achieve a successful process operation.

More recently, the transmission of laser beams through optical fibers, at power levels suitable for performing materials processing, has been successfully demonstrated. Various techniques for the efficient injection of a power laser beam into an optical fiber for transmission therethrough are disclosed, for example, in commonly assigned U.S. Pat. Nos. 4,564,736; 4,676,5S6; and 4,681,396 respectively entitled "Industrial Hand Held Laser Tool and Laser System", "Apparatus and Method for Performing Laser Material Processing Through a Fiber Optic", and "High Power Laser Energy Delivery System", which are incorporated in their entirety herein by reference. Such beam transmission through optical fibers has obviated both the need for positioning the laser close to the workpiece and the optical components otherwise required for directing the laser beam to the desired process points on the workpiece. It is instead required to terminate an output end of each optical fiber with an output coupling device that collimates and focuses the beam emitted by the fiber. Laser materials processing is thus enhanced by the great flexibility afforded by the optical fibers in transmitting the laser beam to any desired process points on the workpiece. The number of fibers, and their respective output ends, that need to be simultaneously positioned proximate the process points on the workpiece varies with the particular process. The ability to position optical fibers close together to accommodate the processing requirements of a particular workpiece is limited by the space requirements of the respective fiber output coupling devices. In some applications, such as the manufacture of microelectronic components, it is desirable to achieve very close spacing of the fibers to accommodate closely spaced process points on the workpiece, e.g., soldering a plurality of adjacent electrical terminal pads.

Also available to enhance laser materials processing are systems for the time sharing of a materials processing laser beam among a plurality of optical fibers. Manufacturers of such beam time sharing systems include Robolase Systems, Inc. of Costa Mesa, Calif. and Lumonics Corporation of Livonia, Mich. By the use of such beam time sharing systems, the beam generated by one laser can be shared among multiple optical fibers the respective output ends of which are positioned proximate the process points on one or more workpieces. As a result, the number of optical fibers that can be simultaneously positioned about a workpiece in a manufacturing/materials processing system is limited by the number of lasers, the number of time sharing systems and the number of fibers that can be simultaneously accommodated by each time sharing system. One disadvantage inherent in such a configuration of equipment, in the case of a repetitive manufacturing process, is that the failure of a single fiber adversely affects the entire process, so that the overall process reliability is in direct proportion to the number of fibers in use. It would therefore be desirable to accommodate the same number of process points on the workpiece with a reduced number of optical fibers. In a conventional laser-materials processing system employing fiber delivery of laser beams, the number of fibers could be reduced by the use of conventional beam splitting hardware, e.g. prisms, mirrors, etc., to split the fiber delivered beam (after collimation). Such additional optical hardware is, however, cumbersome and requires considerable mounting hardware to constantly maintain a precise alignment.

It would further be desirable to serve additional process points without providing additional lasers or time sharing systems. This is especially desirable in consideration of the substantial capital investments required for lasers and time sharing systems. Another disadvantage inherent in the time sharing equipment is an apparent inability to differentiate between the respective amounts of laser energy transmitted through the multiple fibers sharing the same laser. Such laser power differentiation would be desirable where different process points on the same workpiece require different amounts of laser energy to perform the desired process.

OBJECTS OF THE INVENTION

It is a principal object of the present invention to provide a new and improved laser-materials processing system and apparatus which is not subject to the aforementioned problems and disadvantages.

Another object of the present invention is to provide apparatus enabling laser processing of closely spaced process points on a workpiece.

A further object of the present invention is to provide apparatus enabling an increase in the number of laser process points served on a workpiece without an increase in the number of beam transmitting optical fibers.

An additional object of the present invention is to provide apparatus to enable an increase in the number of laser process points served on a workpiece without requiring additional laser or beam time sharing system apparatus.

Yet another object of the present invention is to provide apparatus enabling predetermined amounts of laser energy to be delivered to different process points on a workpiece.

Yet a further object of the present invention is to provide apparatus, for use in a laser-materials processing system, enabling splitting of an optical fiber delivered laser beam without the disadvantages attendant to conventional beam splitting hardware.

SUMMARY OF THE INVENTION

The foregoing objects of the present invention are achieved by means of new and improved apparatus for splitting a beam of light and focusing the split beam at a plurality of focal points. The apparatus comprises a plurality of focusing lens portions each having a respective one of the focal points and means for mounting the lens portions so that the light beam to be split can be directed toward a first side of the mounting means and simultaneously onto the plurality of lens portions such that at least part of the light beam is directed onto each lens portion. The respective lens portion focal points are adjacent a second side of the mounting means opposite the first mounting means side. The lens portions are positioned to achieve a predetermined spatial relationship between the respective lens portion focal points. Thus, upon directing the light beam toward the first mounting means side and onto the lens portions, the beam is simultaneously focused onto the respective lens portion focal points.

Each lens portion has a center point on a major surface thereof and further has a focusing axis, along which the part of the light beam directed thereon is focused, that intersects the lens portion center and focal points. In an illustrated embodiment hereinbelow, the lens portions are positioned so that their respective focusing axes are parallel. Part of a perimeter of each lens portion is contoured to fit with the respective contoured perimeters of the other lens portions.

The lens apparatus of the present invention finds great utility in application in a laser-materials processing system. In such a system, it may be desirable to focus predetermined amounts of laser energy at predetermined points on a workpiece. This is accomplished with the inventive lens apparatus by providing each lens portion such that its respective perimeter is further contoured to provide an area of the major surface proportional to the predetermined amount of laser energy to be focused by the lens portion on the workpiece.

Where the lens apparatus of the present invention is applied to split an optical fiber transmitted beam, it is preferred to mount the inventive lens apparatus in a fiber optic coupling device. Such a device comprises first lens means for collimating the light beam emitted from an end of the fiber and second lens means in the form of the inventive lens apparatus to focus the collimated beam at the respective focal points of the lens portions thereof. The coupling device further includes mounting means for supporting the emitting end of the beam transmitting fiber and the collimating lens in a predetermined alignment therebetween and further for supporting the inventive lens apparatus in alignment with the collimating lens so that the fiber emitted beam is directed through the collimating lens to be collimated thereby and the collimated beam is focused by the inventive lens apparatus. In a laser-materials processing system where the laser beam is optical fiber transmitted to the workpiece, the above described fiber optic coupler is preferably employed.

BRIEF DESCRIPTION OF THE DRAWINGS

While the specification concludes with claims defining the features of the invention that are regarded as novel, it is believed that the invention, together with further objects thereof will be better understood from a consideration of the following description in conjunction with the drawing figures, in which:

DESCRIPTION OF THE INVENTION

Figure 1A:
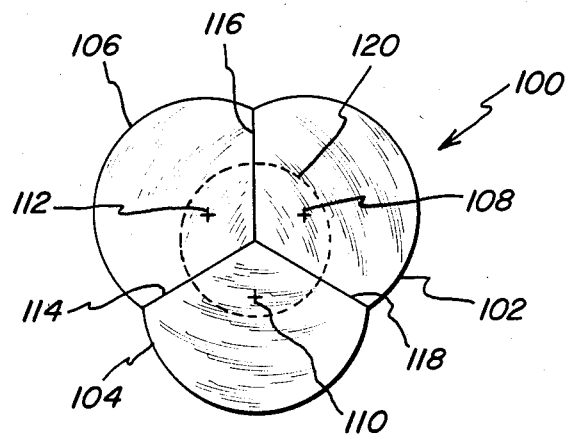
FIGS. 1a and 1b respectively illustrate exemplary lens apparatus constructed in accordance with the present invention.

The present invention is directed to lens apparatus for splitting and focusing a single beam of light onto a plurality of points. In the embodiments illustrated hereinbelow, the present invention is practiced, and its utility demonstrated, with a materials processing laser beam. However, as also indicated below, the scope and utility of the present invention is not limited to such laser materials processing applications. Referring to the drawings, FIG. 1a illustrates exemplary lens apparatus 100 for focusing a single beam of light onto three points. Lens apparatus 100 comprises three lens portions 102, 104 and 106 each being a portion cut from a circular plano-convex focusing lens. The convex side of each lens portion faces the viewer of FIG. 1a. Each lens portion 102, 104 and 106 respectively includes a lens center point 108, 110 and 112 on a major surface thereof. Each center point represents the center of the circular plano-convex lens before cutting to fashion the lens portion. The terminology "major surface" as used herein and known in the art refers to a surface of the lens used for focusing light, as distinguished from an edge surface which lacks such utility. Each lens portion 102,104,106 is fabricated by cutting away a portion of the circular plano convex lens. A part of the perimeter of each lens portion is cut, each such cut being straight and perpendicular to the plane face of the lens, so that the three lens portions are butt fitted together. Thus, lens portions 104 and 106 meet at a seam 114 and the respective perimeter parts of those lens portions meeting at that seam are cut to achieve a butt fit there. In similar fashion, lens portions 106 and 108 meet at a seam 116, while lens portions 108 and 004 meet at a seam 118. For most of the beam splitting applications contemplated herein, it is highly desirable to minimize any light scattering at each seam where lens portions fit together. To minimize such light scattering, it is preferred that the edge surfaces of the lenses being fit together be polished flat to an optical grade finish, be clean and anti-reflection coated. The lens portions are preferably further fit together so that their respective planar major surfaces lie in a common plane.

Still referring to FIG. 1a, a circular beam of light 120 is directed onto lens apparatus 100 so that at least a part f the light beam is directed onto each lens portion. Each lens portion focuses, at its respective focal point, the part of the light being directed thereon. The focal point of each lens portion is located at precisely the same location as for the circular plano-convex lens from which the lens portion is fashioned. Thus, light beam 120 would be focused at the three respective focal points of lens portions 102, 104 and 106 on the far sides of those lens portions, as viewed in FIG. 1a. For illustrative purposes, the lens portions of lens apparatus 100 have been cut to provide a symmetrical arrangement of their respective center points, and hence their respective focal points, though such a symmetrical arrangement is not required for the practice of the present invention.

Figure 1B:
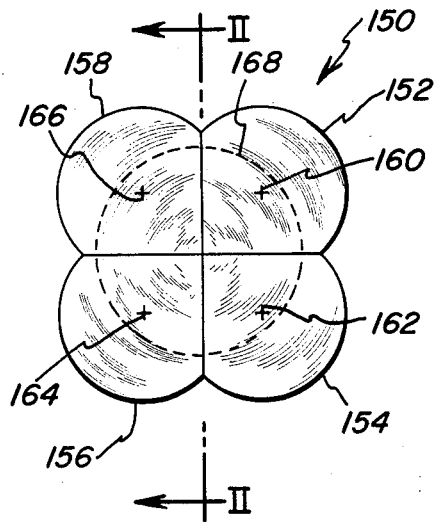

The lens apparatus of the present invention can be readily extended to larger numbers of lens portions. Thus, FIG. 1b illustrates exemplary lens apparatus 150 comprising four lens portions 152, 154, 156 and 158 having respective lens center points 160, 162, 164 and 166. As in the case of lens apparatus 100 (FIG. 1a), each lens portion of lens apparatus 150 is fashioned from a circular plano-convex lens, tee lens center points shown in FIG. 1b being those of the respective circular lenses from which the lens portions are cut. Also as for lens apparatus 100, the parts of the lens perimeters cut to fashion lens apparatus 150 are cut to achieve a butt fit at the seams between the lens portions, the cut surfaces being preferably polished flat and otherwise prepared as described above. The lens portions of FIG. 1b have been cut to provide a symmetrical arrangement to their respective center points. That is, the center points on either side of each seam are equidistant therefrom. As indicated above and described in greater detail below, such a symmetrical arrangement of the center points is not required for the successful practice of the present invention. It is further assumed that the four lens portions of lens apparatus 150 respectively have substantially the same focal length. Given the center point symmetrical arrangement of lens apparatus 150 and the same focal lengths for the lens portions, and assuming the plane sides of the respective lens portions, which face away from the viewer of FIG. 1b, all lie in a common plane, the respective focal points of the four lens portions lie in a common focal plane in the same symmetrical arrangement as their respective center points.

Figure 2:
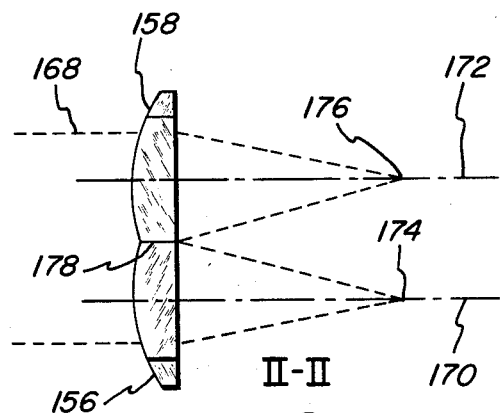
FIG. 2 is a section II—II indicated in FIG. 1b.

A light beam 168 is directed otto the convex sides of the four lens portions. The focusing action of portions 156 and 158 on the light beam is illustrated in FIG. 2 which is section II—II indicated in FIG. 1b. Associated with each lens 156 and 158 are focusing axes 170 and 172 which respectively pass through lens center points 164 and 166 (FIG. 1b). Respective focal points 174 and 176 of lens portions 156 and 158 lie along the respective lens portion focusing axes. Thus, the parts of light beam 168 directed onto lens portions 156 and 158 are respectively focused along focusing axes 170 and 172 onto focal points 174 and 176. Lens portions 152 and 154 effect the same focusing action on the respective parts of light beam 168 directed thereon, as illustrated in FIG. 2 for lens portions 156 and 158. As also seen in FIG. 2, the butting surfaces of lens portions 156 and 158, which meet at a seam 178, are flat and parallel to the respective focusing axes of the lens portions. As a result, where light beam 168 is a collimated laser beam axially parallel to the lens portion focusing axes, scattering of light at the seams between the lens portions is minimized.

Figure 4:
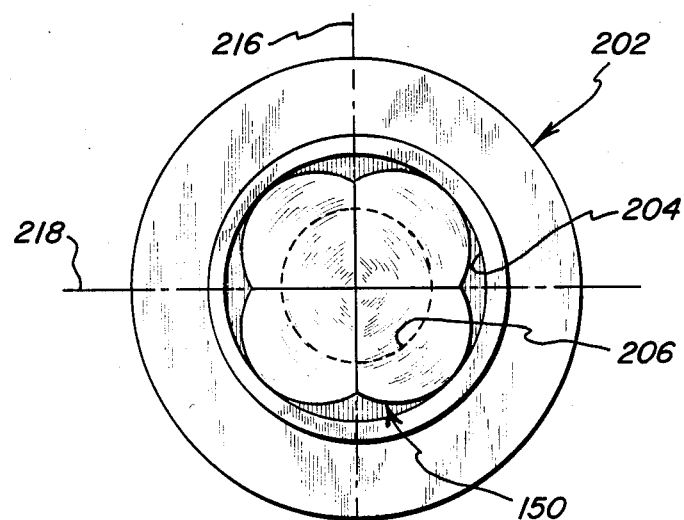
FIG. 4 is a section IV—IV shown in FIG. 3.
Figure 3:
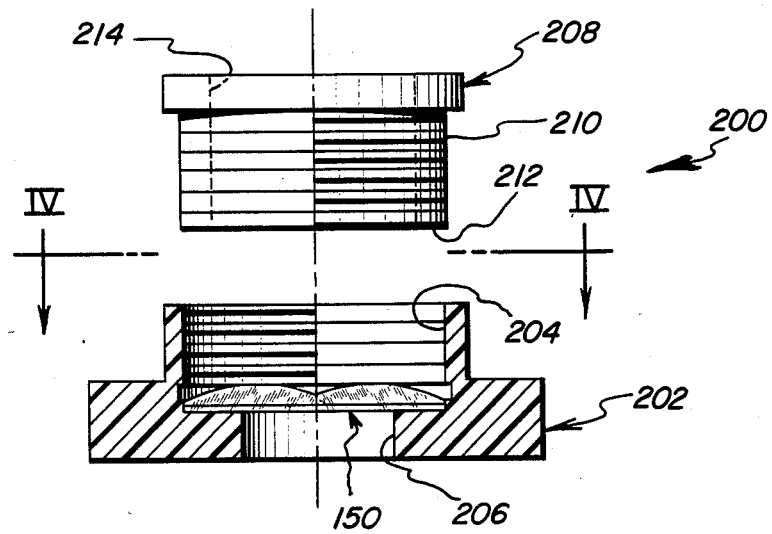
FIG. 3 illustrates mounting apparatus for mounting the lens apparatus of the present invention.

FIG. 3 illustrates an exploded view of a lens mounting apparatus 200 for mounting the lens portions of lens apparatus 150. Apparatus 200 includes a lens seat portion 202 which further includes a cavity portion 204 in which the lens portions of lens apparatus 150 are shown to be seated. FIG. 4 illustrates section IV—IV of FIG. 3 and as can be seen, cavity portion 204 is by nature cylindrical and circular in cross section to receive the generally circular overall cross section of lens apparatus 150. It should also be apparent that the three lens portions of lens apparatus 100 (FIG. 1a) could as readily be accommodated in lens seat 202. The interior cylindrical surface of cavity 204 is threaded. Lens seat 202 further includes a circular aperture 206 sized to enable passage therethrough of the individual beam portions focused by the lens portions of lens apparatus 150. Lens mounting apparatus 200 further includes a cylindrically shaped lens retainer 208. An outer cylindrical portion 210 of lens retainer 208 is threaded to be screw engaged with the thread of cavity portion 204. In this manner, the lens retainer can be screwed down onto lens apparatus 150 to rigidly hold it in place. An 0-ring (not shown) of any rubber-like material may be interposed between a bottom edge surface 212 of retainer 208 and the lens portions retained thereby to obviate damage to those lens portions. As can further be seen in FIG. 3, lens retainer 208 includes a cylindrical passage 214 to enable passage of the beam of light, e.g. the collimated laser beam, to be split and focused by lens apparatus 150. As can also be seen by the provision of center lines 216 and 218 in FIG. 4, due to their symmetrical arrangement as described above, the four lens portions of lens apparatus 150 are substantially centered within cavity 204 of lens seat 202. As a result, the beam of light directed thereon can be readily aligned so that equal parts of the beam are directed onto the four lens portions.

Figure 5:
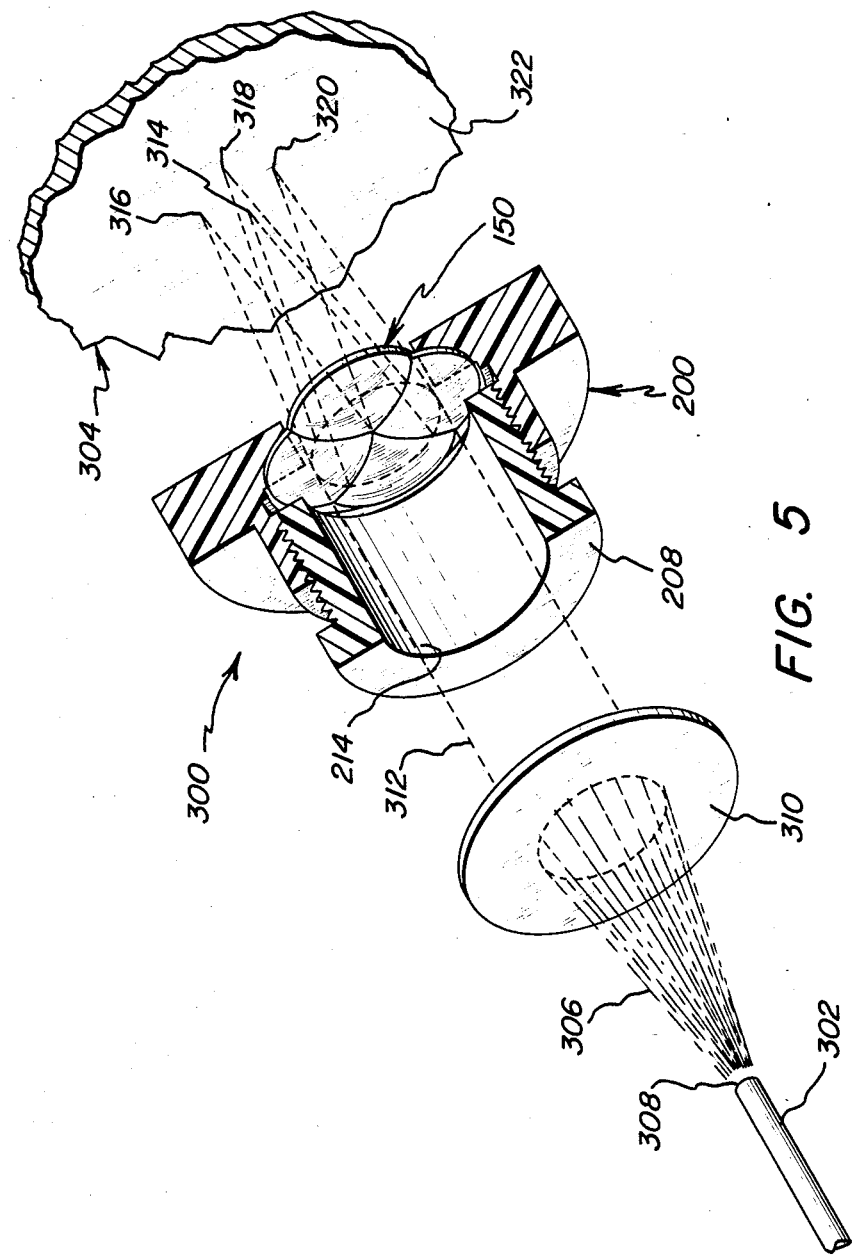
FIG. 5 illustrates a laser-materials processing system which includes the lens apparatus of the present invention.

The lens apparatus of the present invention is believed to have great utility in laser manufacturing-/materials processing operations. This utility of the present invention is illustrated in FIG. 5 which shows a laser-materials processing system 300 in which a laser beam is transmitted via an optical fiber 302 to the proximity of a workpiece 304 and emitted as a diverging beam portion 306 from an output end 308 of the fiber. The diverging beam is collimated by a collimating lens, which is illustrated as a plano-convex lens 310, and the collimated beam 312 is directed into cylindrical passage 214 of lens retainer portion 208 of lens mounting apparatus 200. Lens apparatus 150 as mounted in lens mounting apparatus 200 is assumed to be used in system 300 to split the collimated laser beam into four beam portions to be respectively focused at four points 314, 316, 318 and 320 located on workpiece 304 and respectively corresponding to the four focal points of the lens portions of lens apparatus 150. It is therefore implicit in the illustrated system 300 that a surface 322 of workpiece 304, on which the process points are located, is planar and positioned to be parallel to the plane major surfaces of the lens portions of lens apparatus 150. Lens mounting apparatus 200 is shown partially broken away to facilitate illustration of the beam splitting and focusing effected by the lens portions of lens apparatus 150.

As can be seen in system 300 of FIG. 5, the single beam delivered by fiber 302 is simultaneously applied at four discrete points on workpiece 304. Thus, where four optical fibers would have been required to perform these four processing tasks, the same result is achieved with a single fiber. Further, where beam time sharing apparatus is used in the processing system, three additional fibers can now be accommodated thereby. Additionally, given the appropriate circumstances and the apparatus of the present invention, it may be possible to carry out the same process with fewer lasers and fewer beam time sharing systems. It is also noted that since fewer optical fibers may be required to otherwise serve the same number of process points on the workpiece, the overall reliability of the processing system is increased.

Figure 6:
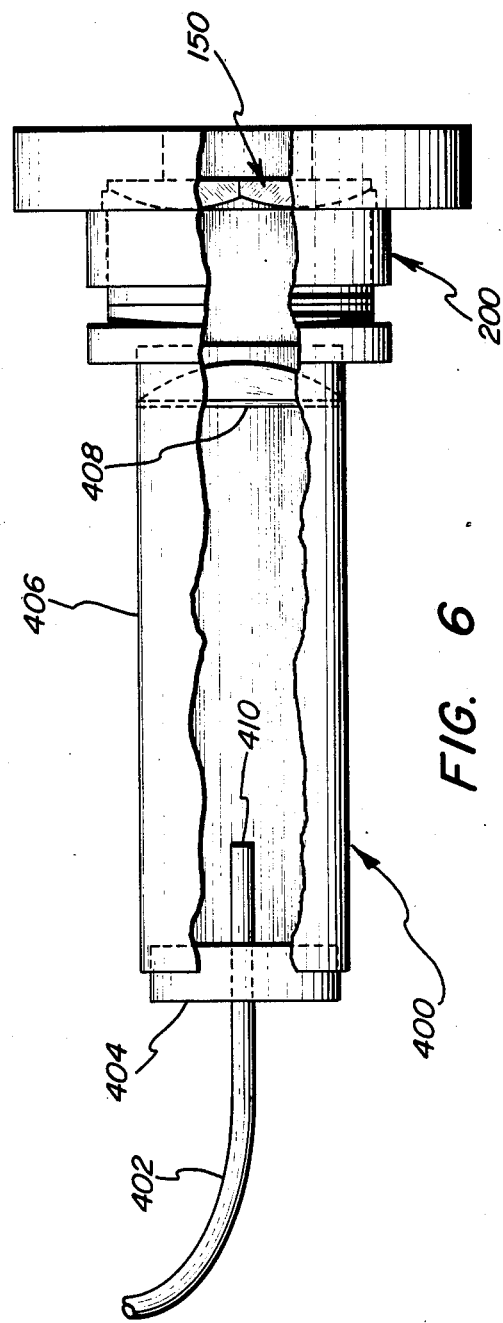
FIG. 6 is a fiber optic output coupler employing the lens apparatus of the present invention.

The beam splitting and focusing apparatus of the present invention when employed with fiber transmitted laser beams is best mounted in a fiber optic output coupler. Such a coupler is not shown in FIG. 5 in order to enhance the clarity of the system illustrated therein. However, the use of such couplers is required to properly align the optical fiber, collimating lens and the lens splitting and focusing apparatus of the present invention with one another and with the process points on the workpiece in the processing system. FIG. 6 illustrates a fiber optic output coupler 400 employing lens apparatus 150 (FIG. 1b) as mounted in mounting apparatus 200 (FIG. 3, 4). An optical fiber 402 is firmly held in a fiber support 404 which is mounted in a cylindrical tube 406. The construction of fiber support 404 is not shown in detail, such supports being well known in the art. Exemplary fiber supports are disclosed in the above-incorporated U.S. Pat. Nos. 4,564,736 and 4,676,586. Coupler 400 further includes a plano-convex collimating lens 408 for collimating the laser beam emitted from an output end 410 of fiber 402. The cylindrical surface of cylindrical passage 214 of lens retainer 208 may be threaded (not shown) to enable screw engagement with a corresponding thread (not shown) on the outside surface of 406 at the end proximate collimating lens 408.

While the lens portion center points and corresponding focal points of the lens portions of lens apparatus 100 and 150 are symmetrically arranged, the invention is not so limited. The individual lens portions may instead be fabricated from circular plano-convex lenses to provide a nonsymmetrical, entirely arbitrary pattern. Such a pattern would be selected to correspond to the required process point pattern of the workpiece being processed. Further, the lens center point pattern can be selected to accommodate closely spaced process points such as may be encountered in the above noted example of adjacent terminal pads in a microelectronic circuit fabrication application. Thus, by using the beam splitting and focusing apparatus of the present invention, a plurality of closely spaced process points can be accommodated with a single fiber. As a result, the prior art need for multiple fibers is obviated and the fiber-to-fiber spacing constraint deriving from the dedicated output couplers required for the multiple fibers is eliminated. Further, the lens portions of the lens apparatus of the present invention may be cut to distribute thereamong the laser beam energy directed thereon to focus different predetermined amounts of laser energy at the respective workpiece process points.

Figure 7A:
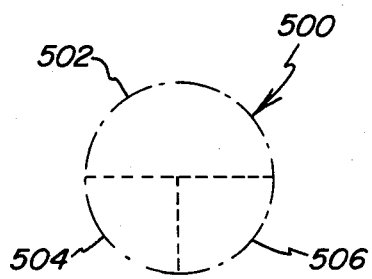
FIGS. 7a, 7b and 7c illustrate the steps for constructing the lens apparatus of the present invention to achieve an arbitrary focal point pattern and enable differentiation between the amounts of laser beam energy delivered to the lens apparatus focal points.
Figure 7B:
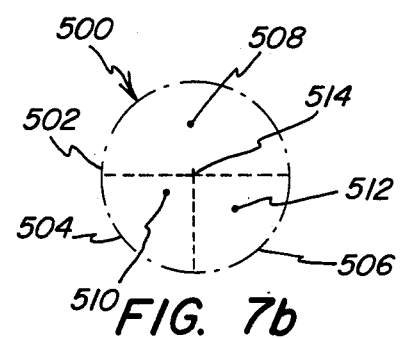
Figure 7C:
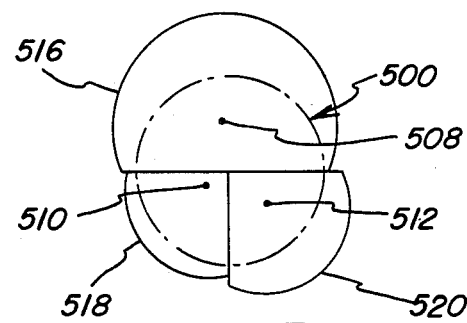

The provision of an arbitrary focal point pattern and the differentiation in the amounts of laser energy focused at the respective lens portion focal points, and hence workpiece process points, are illustrated in FIG. 7a, 7b and 7c. FIG. 7a illustrates a circular projection 500 of a collimated laser beam as would be projected on the lens portions of the beam splitting and focusing apparatus of the present invention. It is assumed that the beam is to be split into three portions such that one portion focusses 50% of the total laser beam energy and the remaining two portions each focus 25% of the total energy. Beam projection 500 in FIG. 7a is accordingly divided into three portions 502, 504 and 506 where portion 502 represents 50% of the projected beam area and portions 504 and 506 each represent 25% of the projected area. Next, the desired pattern of three process points 508, 510 and 512 are illustrated in FIG. 7b. A geometric center 514 of the process point pattern is determined and indicated in FIG. 7b by a "+". Following this determination, beam projection 500 as divided into three portions is overlayed on the process point pattern so that the center of the beam projection coincides with geometric center 514. It then remains to fashion each of the three lens portions to focus the laser beam onto the three process points. Each circular lens, from which a lens portion is to be cut, must be of sufficient diameter such that its corresponding portion of the beam projection is entirely occluded and further such that its center point coincides with the particular process point with which it is associated. The seams where the three lens portions meet correspond to the divisions of the beam projection illustrated in FIGS. 7a and 7b. Thus in FIG. 7c are shown three lens portions 516, 518 and 520 having respective center points coinciding with process points 508, 510 and 512. Note further that each lens portion entirely occludes its corresponding portion of beam projection 500. The three lens portions 516, 518 and 220 would therefore serve to focus the collimated laser beam directed thereon as projection 500 onto the three process points 508. 510 and 512 such that 50% of the laser energy is focussed at process point 508 and 25% of the laser energy is focussed at each process point 510 and 512. The extension of this three process point example to a greater number of process points should now be readily apparent to those skilled in the art.

While the lens apparatus of the present invention has been illustrated and described as having lens portions each having the same focal length, the invention is not so limited. Each lens portion may be fabricated from a lens having a different focal length, where such focal lengths are selected to correspond to the respective distances between the workpiece process points and the lens portions. Thus, the lens apparatus of the present invention may be practiced in a laser-materials processing system in which the process points served by such beam splitting and focussing apparatus need not lie in a common plane.

While the respective focusing axes of the lens portions of the present invention have been illustrated and described hereinabove as parallel, the invention is not so limited. The individual lens portions may be pitched with respect to one another so that their respective lens axes are not parallel. In this manner, given lens apparatus with a set of lens portions having a symmetrical distribution of center points, e.g. lens apparatus 100 (FIG. 1a) and lens apparatus 150 (FIG. 1b), the respective lens portions can be pitched to accommodate a nonsymmetrical set of process points on a workpiece.

In the operation of the present invention illustrated and described hereinabove, the light beam being split and focussed is directed onto each lens portion of the lens apparatus so as to include the center point of each lens portion. The invention is not so limited. The beam need not be directed onto so much of each lens portion as to include the center point thereof. Due to the focusing property of each such lens, the lens portion will focus the light directed thereon onto its focal point irrespective of whether or not the light beam being focussed is directed onto the lens center point. Thus for example in FIG. 1a, a light beam smaller in diameter that beam 120 and delineated within center points 108, 110 and 112 would nevertheless be focussed at the respective focal points of lens portions 102 104 and 106.

The use of lens center points to align each lens portion focal point with its corresponding process point is clear from the description hereinabove. The invention is, however, not so limited. A lens portion may be fashioned to exclude the lens center point and the lens will still focus light directed thereon. It would, however, be necessary to determine the focal point of such a lens portion either by computation or experimentation.

While the lens portions of the lens apparatus of the present invention are cut and fit together with straight seams, the invention is not so limited. If utility may be gained thereby, the lens portions may be cut to provide any seam contour. Also, while the lens apparatus and fiber optic coupler of the present invention, as illustrated and described hereinabove, are constructed from plano-convex lenses, the invention is not so limited. Any focussing lenses, including multi-element lenses, may be used to construct lens apparatus and fiber optic couplers in accordance with the present invention. With respect to the use of multi-element lenses, it should be readily apparent to those skilled in the art that each lens portion would then comprise a set of lens element portions corresponding to the multiple elements of the multi-element focussing lens from which it is fashioned.

While the present invention has been illustrated and described as having great utility in laser-materials processing systems, the invention may also find great utility in other applications. For example, in a communications application, it may be desirable to split a digitally encoded signal propagated by a light beam, into a plurality of identical signals. The utility of the present invention to provide such signal splitting is readily apparent.

While the present invention has been illustrated and described for lens apparatus having a generally circular cross section, e.g. FIGS. 1a and 1b, the invention is not so limited. A rectangular configuration of lens portions, for example eight lens portions arranged in a 2×4 lens portion rectangular pattern may be successfully implemented to split and focus a light beam at eight discrete points. In such a case, the beam to be split would first be shaped by use of a cylindrical lens and then collimated to provide a collimated beam having a rectangular cross section. The collimated rectangular beam would then be directed onto the eight lens portion configuration.

While a preferred embodiment has been illustrated and described herein, it will be obvious that numerous modifications, changes, variations, substitutions and equivalents, in whole or in part, will now occur to those skilled in the ar without departing from the spirit and scope contemplated by the invention. Accordingly, it is intended that the invention herein be limited only by the scope of the appended claims.

What is claimed is:

1. Apparatus for splitting a beam of light, comprising:
   a plurality of focusing lens portions each having a respective focal point, each said lens portion being fashioned from a focusing lens;
   means for mounting said lens portions so that the light beam to be split can be directed toward a first side of said mounting means and simultaneously onto said plurality of lens portions so that at least part of said light beam is directed onto each said lens portion, the respective focal point of said lens portions being adjacent a second side of said mounting means opposite said first mounting means side; and
   said lens portions being positioned to achieve a predetermined spatial relationship between the respective focal points of said lens portions;
   whereby said light beam, upon being directed toward said first mounting means side and onto said lens portions, is simultaneously focussed onto the respective focal points of said plurality of lens portions.

2. The apparatus of claim 1 wherein each said lens portion has a focusing axis along which the part of said light beam directed thereon is focussed; and said lens portions being positioned so that the respective focusing axes of said lens portions are parallel.

3. The apparatus of claim 1 wherein at least part of a perimeter of each one of said lens portions is contoured to fit with the respective contoured perimeters of the other ones of said lens portions.

4. The apparatus of claim 3 wherein said light beam is a collimated laser beam.

5. The apparatus of claim 4 wherein the perimeter of each said lens portion is further contoured to provide an area of a lens portion major surface proportional to a predetermined amount of laser energy to be focussed at the lens portion focal point, so that upon directing said collimated laser beam onto said plurality of lens portions, the respective predetermined amounts of laser energy are focussed at the respective lens portion focal points.

6. The apparatus of claim 3 wherein each said lens portion includes a lens portion center point on a major surface thereof; and
   a focusing axis of said lens portion intersecting said lens portion center point and the respective focal point of said lens portion.

7. The apparatus of claim 6 wherein said light beam is a collimated laser beam; and
   the perimeter of each said lens portion being further contoured to provide an area of said major surface proportional to a predetermined amount of laser energy to be focussed at the lens focal point, so that upon directing said collimated laser beam onto said plurality of lens portions, the respective predetermined amounts of laser energy are focussed at the respective lens portion focal points.

8. A beam splitting output coupler for a light beam transmitting optical fiber, comprising:
   first lens means for collimating a light beam emitted from an end of the beam transmitting fiber;
   second lens means for focusing the collimated light beam at a plurality of predetermined focal points; and
   mounting means for supporting the emitting end of the beam transmitting fiber and said first lens means to maintain a predetermined alignment therebetween, said mounting means further supporting said second lens means in a further predetermined alignment with said first lens means, so that the fiber emitted light beam is directed through said first lens means to be collimated thereby and the collimated beam is focussed by said second lens means at the plurality of predetermined focal points.

9. The output coupler of claim 8, said second lens means comprising a plurality of focusing lens portions each having a respective one of said predetermined focal points.

10. The output coupler of claim 9 wherein said lens portions of said second lens means are supported by said mounting means to achieve a predetermined spatial relationship between the respective focal points of said lens portions.

11. The output coupler of claim 10 wherein the predetermined alignment of said second lens means with said first lens means is such that at least part of said light beam is directed onto each said lens portion;
   each said lens portion having a focusing axis along which the part of said light beam directed thereon is focussed; and said lens portions being supported by said mounting means so that the respective focusing axes of said lens portions are parallel.

12. The output coupler of claim 10 wherein said light beam is a laser beam; and
at least part of a perimeter of each one of said lens portions being contoured to fit with the respective contoured perimeters of the other ones of said lens portions.

13. The output coupler of claim 12 wherein the perimeter of each said lens portion is further contoured to provide an area of a lens portion major surface proportional to a predetermined amount of laser energy to be focussed at the lens portion focal point; and
the predetermined alignment of said second lens means with said first lens means being such that the laser beam collimated by said first lens means is directed onto said plurality of lens portions so that the respective predetermined amounts of laser energy are focussed at the respective lens portion focal points.

14. The output coupler of claim 12 wherein each said lens portion includes a lens portion center point on a major surface thereof;
a focusing axis of said lens portion intersecting said lens portion center point and the respective focal point of said lens portion; and
said lens portions being supported by said mounting means so that the respective focusing axes of said lens portions are parallel.

15. The output coupler of claim 14 wherein the perimeter of each said lens portion is further contoured to provide an area of said major surface proportional to a predetermined amount of laser energy to be focussed at the lens portion focal point; and
the predetermined alignment of said second lens means with said first lens means being such that the laser beam collimated by said first lens means is directed onto said plurality of lens portions so that the respective predetermined amounts of laser energy are focussed at the respective lens portion focal points.

16. A laser-materials processing system, comprising:
means for injecting a laser beam generated by a materials processing laser into an input end of a beam transmitting optical fiber;
beam splitting means, coupled to an output end of said beam transmitting fiber, for splitting the beam transmitted thereby into a plurality of focussed beam portions, a like plurality of focal points respectively corresponding to said focussed beam portions being located at predetermined points on a workpiece being subjected to laser processing;
said beam splitting means comprising:
first lens means for collimating the laser beam emitted from the output end of said beam transmitting fiber;
second lens means for focusing the collimated laser beam at said plurality of focal points located on the workpiece; and
mounting means for supporting the beam transmitting fiber output end and said first lens means to maintain a predetermined alignment therebetween, said mounting means further supporting said second lens means in a further predetermined alignment with said first lens means, so that the laser beam emitted from the fiber output end is directed through said first lens means to be collimated thereby and the collimated beam is focussed by said second lens means at said plurality of focal points.

17. The laser-materials processing system of claim 16, said second lens means comprising a like plurality of focusing lens portions equal in number to said plurality of focal points, each lens portion having a respective one of said focal points; and
at least part of a perimeter of each one of said lens portions being contoured to fit with the respective contoured perimeters of the other ones of said lens portions.

18. The laser-materials processing system of claim 17 wherein said lens portions of said second lens means are supported by said mounting means to achieve a predetermined spatial relationship between the respective focal points of said lens portions to correspond to the predetermined points on the workpiece.

19. The laser-materials processing system of claim 18 wherein the predetermined alignment of said second lens means with said first lens means is such that at least part of the collimated laser beam is directed onto each said lens portion;
each said lens portion having a focusing axis along which the portion of the collimated laser beam directed thereon is focussed; and
said lens portions being supported by said mounting means so that the respective focusing axes of said lens portions are parallel.

20. The laser-materials processing system of claim 18 wherein the perimeter of each said lens portion is further contoured to provide an area of a lens portion major surface proportional to a predetermined amount of laser energy to be focussed at the lens portion focal point; and
the predetermined alignment of said second lens means with said first lens means being such that the laser beam collimated by said first lens means is directed onto said plurality of lens portions so that the respective predetermined amounts of laser energy are focused at the predetermined points on the workpiece.

21. The laser-materials processing system of claim 20 wherein each said lens portion includes a lens portion center point on the major surface thereof;
a focusing axis of each said lens portion intersecting said lens portion center point and the respective focal point of said lens portion; and
said lens portions being supported by said mounting means so that the respective focusing axes of said lens portions are parallel.

* * * * *